(12) United States Patent
Thakur et al.

(10) Patent No.: US 7,922,382 B2
(45) Date of Patent: Apr. 12, 2011

(54) APPARATUS FOR CONSUMABLE POWDER RECONSTITUTION AND FROTHING

(75) Inventors: Beli R. Thakur, New Milford, CT (US); Juan J. Gonzalez, New Milford, CT (US); Hanspeter Pleisch, Danbury, CT (US); David Casey Guerrera, Woodbury, CT (US); Stephen Daniel Westfall, Goshen, CT (US); Alexander A. Sher, Danbury, CT (US)

(73) Assignee: Nestec S.A., Vevey (CH)

( * ) Notice: Subject to any disclaimer, the term of this patent is extended or adjusted under 35 U.S.C. 154(b) by 892 days.

(21) Appl. No.: 11/741,965

(22) Filed: Apr. 30, 2007

(65) Prior Publication Data
US 2007/0202227 A1 Aug. 30, 2007

Related U.S. Application Data

(62) Division of application No. 10/916,503, filed on Aug. 12, 2004, now Pat. No. 7,226,631.

(51) Int. Cl.
*B01F 5/02* (2006.01)
(52) U.S. Cl. ............... 366/137.1; 366/165.1; 366/165.2
(58) Field of Classification Search ............... 366/137.1, 366/162.4, 165.1, 165.2
See application file for complete search history.

(56) References Cited

U.S. PATENT DOCUMENTS

| | | | |
|---|---|---|---|
| 2,126,911 A * | 8/1938 | Mullen | 516/77 |
| 2,746,728 A * | 5/1956 | Pomerleau | 239/421 |
| 2,939,614 A | 6/1960 | Hill | |
| 2,976,158 A | 3/1961 | Morgan et al. | |
| 3,814,826 A | 6/1974 | Lubsen et al. | |
| 4,220,673 A | 9/1980 | Strobel | |
| 4,323,314 A * | 4/1982 | Kaiser-Wirz | 366/137.1 |
| 4,388,338 A | 6/1983 | Wittenborg | |
| 4,493,249 A | 1/1985 | Stover | |
| 4,846,582 A * | 7/1989 | Davidsson | 366/137.1 |
| 5,207,148 A * | 5/1993 | Anderson et al. | 99/281 |
| 5,335,588 A | 8/1994 | Mahlich | |
| 5,360,620 A | 11/1994 | Hsu | |
| 5,803,320 A * | 9/1998 | Cutting et al. | 222/641 |
| 5,884,552 A | 3/1999 | Lussi et al. | |
| 6,183,800 B1 | 2/2001 | Van Straten et al. | |
| 6,253,667 B1 | 7/2001 | Lussi et al. | |

(Continued)

FOREIGN PATENT DOCUMENTS
EP 0458310 9/1994
(Continued)

OTHER PUBLICATIONS

Derwent Database Abstract. ACC No. 1979-78704 for SU 645638 published Feb. 8, 1979.
(Continued)

*Primary Examiner* — David L Sorkin
(74) *Attorney, Agent, or Firm* — Gail C. Silver; Borden Ladner Gervais LLP

(57) ABSTRACT

A method and apparatus for reconstituting consumable powder(s) with a liquid to provide a food liquid such as milk, cappuccino-type beverage, or soup with or without froth. The powder is introduced into a container and pre-wetted by an intersecting liquid spray. Further mixing occurs in the container. The container may have additional liquid streams feeding into the container for increased mixing. This food liquid can then be aspirated by the Venturi effect by steam generation to produce a frothed/aerated food liquid.

9 Claims, 10 Drawing Sheets

U.S. PATENT DOCUMENTS

| | | |
|---|---|---|
| 6,626,086 B2 | 9/2003 | Eugster |
| 6,681,685 B2 | 1/2004 | Mahlich |
| 2003/0089244 A1 | 5/2003 | Imboden et al. |
| 2003/0150879 A1 | 8/2003 | Ufheil et al. |
| 2004/0025701 A1 | 2/2004 | Colston et al. |
| 2004/0137128 A1 | 7/2004 | Hayes et al. |
| 2006/0045942 A1 | 3/2006 | Sher et al. |

FOREIGN PATENT DOCUMENTS

| | | |
|---|---|---|
| EP | 1116464 | 7/2001 |
| EP | 1264567 | 12/2002 |
| EP | 1348364 | 10/2003 |
| FR | 2745485 | 9/1997 |
| WO | 02087400 | 11/2002 |
| WO | 02100224 | 12/2002 |
| WO | 03041506 | 5/2003 |

OTHER PUBLICATIONS

Derwent Database Abstract. ACC No. 1991-337512 for SU 1613096 published Dec. 15, 1990.

Derwent Database Abstract. ACC No. 1980-12346 for SU 665883 published Jun. 7, 1979.

\* cited by examiner

APPARATUS FOR CONSUMABLE POWDER RECONSTITUTION AND FROTHING

CROSS-REFERENCE TO RELATED APPLICATIONS

This is a divisional of U.S. application Ser. No. 10/916,503, filed Aug. 12, 2004.

FIELD OF THE INVENTION

The present invention relates generally to a method and apparatus for consumable powder reconstitution and frothing. More particularly, the present invention relates to pre-wetting and mixing consumable powders and frothing consumable food liquids obtained thereby.

BACKGROUND OF THE INVENTION

It is commonly understood in the food service industry that reconstitution of powders creates certain problems not encountered during typical reconstitution of dehydrated products. In food service dispensing such as point of sale coffee machines or the like, the products need to be mixed quickly as time and temperature are limiting factors. Currently, whipper/mixing bowl assemblies are commonly used for mixing/frothing during dispensing. However, such assemblies have certain disadvantages: (i) powders may stick to many dead spots and compromise safety due to related bacterial growth; (ii) there is more wear and tear due to moving parts; (iii) there is damage to particulates from excess contact with such moving parts; and (iv) increased costs associated with use of such assemblies. Moreover, the quality of froth is often perceived to be lower from a whipper/mixing bowl assembly. Another limitation of existing mixing/frothing systems relates to the dispensing time and temperature of the final delivered food. For instance, for large volumes of beverages, such as 250 mL or more, the delivery time is far too long, as the water flow rate must be maintained slow so that an efficient mechanical mixing and frothing can be carried out. Prolonged delivery times of beverages are not well accepted by end-users. Furthermore, the delivery of cold or ambient liquid food from powder creates dissolution problems as powder poorly dissolves with ambient or cold water.

One commonly known type of dispensing system uses an impeller driven by an electric motor that mixes powder with water in a mixing bowl. This system requires frequent cleanings and may have some negative hygienic issues related to residual product left in the mixing container. When using powders, precipitation of non-dissolved powder particles as well as stratification of liquids may occur in the container—e.g., a cup or bowl—after dispensing. Further, considerable maintenance may be required for the mixing container and the impeller motor. Moreover, currently only liquid milk is used to produce steam froth. Liquid milk, as opposed to powder, has disadvantages in handling such as shelf life, the need for refrigeration, and hygienic concerns.

Consequently, it is desirable to have a more efficient, compact, hygienic, relatively low cost solution to deliver uniform high quality steam foam or foamed beverages—e.g., milk froth—through dispensing of powder ingredients without the use of a motorized whipper.

Certain whipperless systems are taught in the prior art. WO 02/087400 to Hayes et al. and WO 03/041506 to Charman describe methods of producing foamed beverages including the steps of providing a capsule containing a powder, injecting water into the capsule to mix with the powder, allowing the resultant mixture to escape into a receptacle, and injecting water into the receptacle by way of a jet to produce a foamed liquid in the receptacle. Hayes et al. and Charman do not teach intersecting streams of powder and liquid.

U.S. 2003/0089244 to Imboden et al. describes an assembly for generating milk foam and for heating milk. A mixing element receives, in order, a first stream of steam, air, a second stream of steam, and liquid milk. The starting material is liquid milk, rather than a powder.

U.S. Pat. No. 5,335,588 to Mahlich describes a device for preparing milk froth for cappuccino. The device comprises a steam inlet and an air inlet that lead through a Venturi to an opening. The opening is submerged in liquid milk, for instance in a cup, such that the steam, air, and milk are mixed to create foamed milk. This method is known as "in-cup frothing." The starting material is liquid milk, rather than a powder. Similarly, FR 2 745 485 to Jorge also relates to in-cup frothing with liquid milk, rather than a powder.

U.S. Pat. No. 6,681,685 to Mahlich describes a device for preparing milk froth for cappuccino. The device first mixes liquid milk and air. This mixture is then fed into an area into which steam is output. The starting material is liquid milk, rather than a powder.

U.S. Pat. Nos. 5,884,552 and 6,253,667 to Lüssi et al. describe an emulsifier for preparing frothed milk and hot milk. Liquid milk is first mixed with air. This mixture is then mixed with steam. Optionally, the mixture is mixed with coffee.

U.S. Pat. No. 6,183,800 to van Straten et al. describes a method for preparing milk or café crème. Water is introduced into a Venturi container causing coffee concentrate or liquid milk concentrate to be sucked in. The water and coffee concentrate then flow to a whirl container for mixing and dispensing.

EP 0458310 to Vogt et al. describes a foaming coffee whitener that produces a foamed cappuccino-like beverage. Frothing via such a whitener is generally considered inferior to pressure-based frothing.

WO 02/100224 to Wessels et al. discloses an apparatus for preparing a beverage with a foam layer. The apparatus includes a whirl chamber that combines a liquid concentrate with steam to produce a foam layer.

EP 1,348,364 to Vittecoq describes an apparatus for mixing and foaming a powder-based beverage with at least two jets directed in a cup either simultaneously or alternatively, at different orientations and different heights, and without rotating the cup. Vittecoq does not teach intersecting streams of powder and liquid.

U.S. Pat. No. 4,388,338 to Wittenborg describes a method and device for preparing powder-based beverages including multiple streams. A pre-measured amount of powder is filled in a cup and the cup is partially filled with a first quantity of water via a low velocity stream. Subsequent stream(s) are provided at higher velocities to whip the beverage. Such a system would tend to exhibit residual unmixed powder that may collect at the bottom of the cup during the low velocity stage.

It is desired to provide a method and apparatus to pre-wet consumable powder by a liquid to overcome the undesirable characteristics, drawbacks, and disadvantages of the systems currently used. It is also desired to provide a method and apparatus to deliver more quickly and efficiently high quality frothed beverages obtained by reconstitution from a powder.

SUMMARY OF THE INVENTION

It is an object of the present invention to obviate or mitigate at least one disadvantage of previous systems.

In a first aspect, the present invention provides a method of reconstituting consumable powder to form a food product, the method comprising the steps of: introducing a powder into a container; pre-wetting said powder to form a pre-wetted powder by introducing a wetting liquid stream into said container such that said wetting liquid stream intersects in mid-air with said powder as said powder is introduced into said container; and mixing said pre-wetted powder to form a food liquid reconstituted from said powder by introducing a mixing liquid stream into said container.

In a second aspect, the present invention provides a method of reconstituting a consumable powder to form a frothed food product, the method comprising the steps of: introducing a powder into a container; pre-wetting said powder to form a pre-wetted powder by introducing a wetting liquid stream into said container such that said wetting liquid stream intersects in mid-air with said powder as said powder is introduced into said container; mixing said pre-wetted powder to form a food liquid reconstituted from said powder by introducing one or more mixing liquid streams into said container combining said food liquid with steam; and frothing said food liquid by way of a Venturi effect device.

In a third aspect of the present invention, there is provided an apparatus for reconstituting consumable powder in a container comprising: a receptacle for holding and dispensing powder into a container; a liquid delivery means for dispensing a wetting liquid stream and a mixing liquid stream into said container, said wetting liquid stream for pre-wetting said powder in mid-air within said container by wetting said powder as said powder is dispensed in order to form a wetted powder and said mixing liquid stream for mixing said wetted powder with liquid to form a food liquid reconstituted from said powder.

Other aspects and features of the present invention will become apparent to those ordinarily skilled in the art upon review of the following description of specific embodiments of the invention in conjunction with the accompanying figures. Embodiments of the present invention will now be described, by way of example only, with reference to the attached figures.

BRIEF DESCRIPTION OF THE DRAWINGS

A detailed description of the figures will now be discussed with identical elements numbered similarly.

DETAILED DESCRIPTION

Generally, the present invention provides a method and apparatus for pre-wetting and mixing a powder with a liquid to provide a consumable food product reconstituted from a powder (i.e., food liquid) such as, but not limited to, milk, cocoa, soup, or powdered flavorings. Mixing may include simultaneous or subsequent frothing. The powder is introduced into a container and pre-wetted by an intersecting liquid stream or spray. Powder and liquid intersect in a zone where powder is loosely falling into the container. This is effective so a majority of the particles of powder can be wetted by water. Further mixing occurs in the container. The container may be the final dispensing cup such that "in-cup mixing" may occur. Frothing that occurs within "in-cup mixing" will occur in the final dispensing cup.

Alternatively, the container may be an intermediate container for purposes of pre-wetting and mixing the liquid and powder where any frothing can occur separate from the intermediate container. Such will be further explained hereinbelow. The container may have additional liquid streams feeding into the container for improved mixing. The liquid streams may be formed from differing liquids such as, but not limited to, water(s) of varying temperatures, coffee, or juice. The inner surface of the intermediate container may be smooth or may include one or more baffles on such inner surface of the container in order to further improve mixing by increasing turbulence. When an intermediate container is used for pre-wetting and mixing, the food liquid can then be aspirated via the Venturi effect and combined with steam to produce a frothed food product such as, but not limited to, milk froth, cappuccino type beverages, or fruit juice based beverages.

Figure 1:
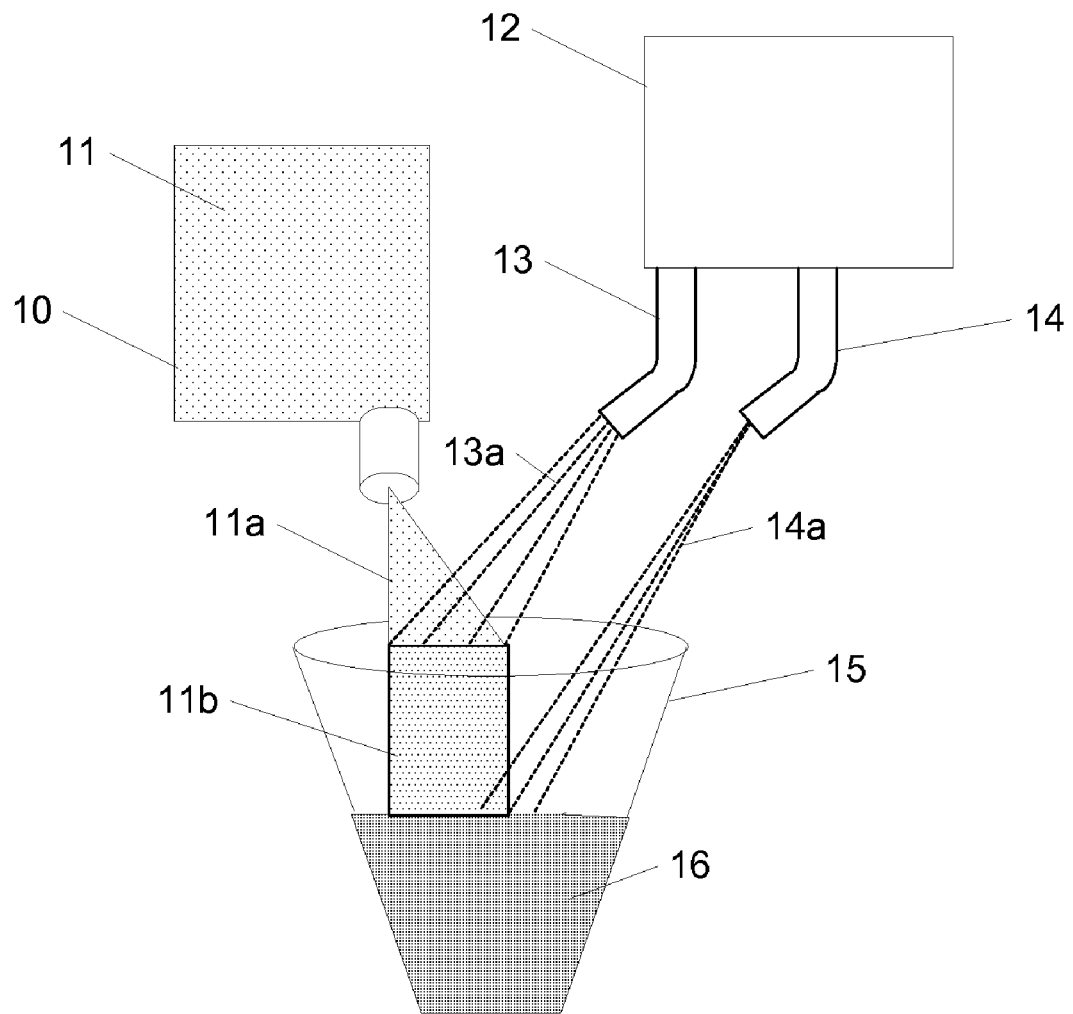
FIG. 1 is a schematic diagram showing pre-wetting and in-cup mixing according to an embodiment of the present invention.

With reference to FIG. 1, a schematic diagram is shown for pre-wetting and in-cup mixing according to an embodiment of the present invention. A powder compartment 10 is shown for dispensing a powder 11. A liquid compartment is shown that includes at least two jets 13, 14 introducing two streams of liquid 13a, 14a. The jets may be sprays or mere flows of the liquid depending upon when or if frothing is desired. The dispensed powder 11a is pre-wetted by a first stream (i.e., wetting liquid stream) of liquid 13a dispensed from the jet 13. The powder 11 is effectively dropped towards a container 11b and intercepted in mid-air by the first stream of liquid 13a. As mentioned above, the liquid may be water or other fluid and may be cold, ambient, or otherwise. The present invention is arranged such that first stream of liquid 13a intersects with the dispensed powder 11a as the two streams enter the container 11b.

It should be noted that wetting of the powder while the powder particulates are suspended in mid-air at the top of the container 11b results in an advantageous pre-wetting that provides for little or no residual powder remaining in an unmixed state after addition of a mixing stream 14a. This is beneficial in several ways including increasing homogeneity of the resultant mixture as well as mitigating microbial growth on related surfaces. The mixing stream 14a is provided by a second jet 14 in order to form a reconstituted food product 16 from the powder 11. The reconstituted food product 16 is thereby formed within a container 15 in the manner described earlier as "in-cup mixing" where the container 15 is an end-user's cup such as a single-use disposable coffee cup or the like.

Figure 2:
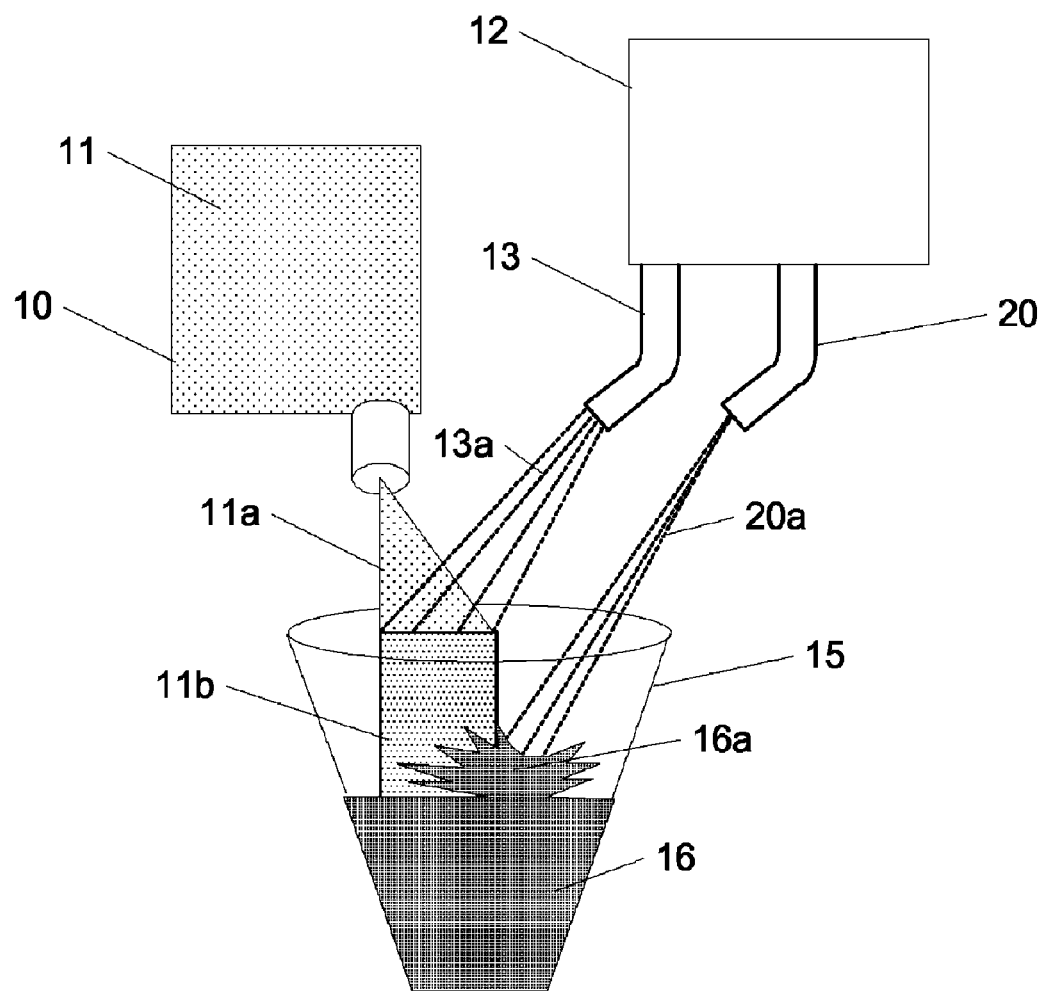
FIG. 2 is a schematic diagram showing pre-wetting and in-cup mixing/frothing according to another embodiment of the present invention.

It should be further understood that liquids may be introduced under some force. As can be seen from FIG. 2, the second stream 20*a* may be sufficiently forceful to create frothing 16*a* within the container 15. In such instance, the second stream 20*a* is formed by a jet 20 that may be a fountain, shower, or the like and directed into the container 15 at a sustained pressure or pulsed pressure. In such instance, this is considered to be "in-cup mixing/frothing" and is advantageous for result food products that include, but are not limited to, milk froth. In accordance with the present invention, the pre-wetted powder 11*b* is further addressed lower in the container 15 by the second stream of liquid 20*a* at a pressure of at least 5 psi or between 5 and 15 psi. Liquid stream linear velocities may vary from 500 to 1600 cm/s. At a pressure of 5 psi or higher, sufficient turbulence would be produced to disperse and dissolve the powder.

Figure 3:
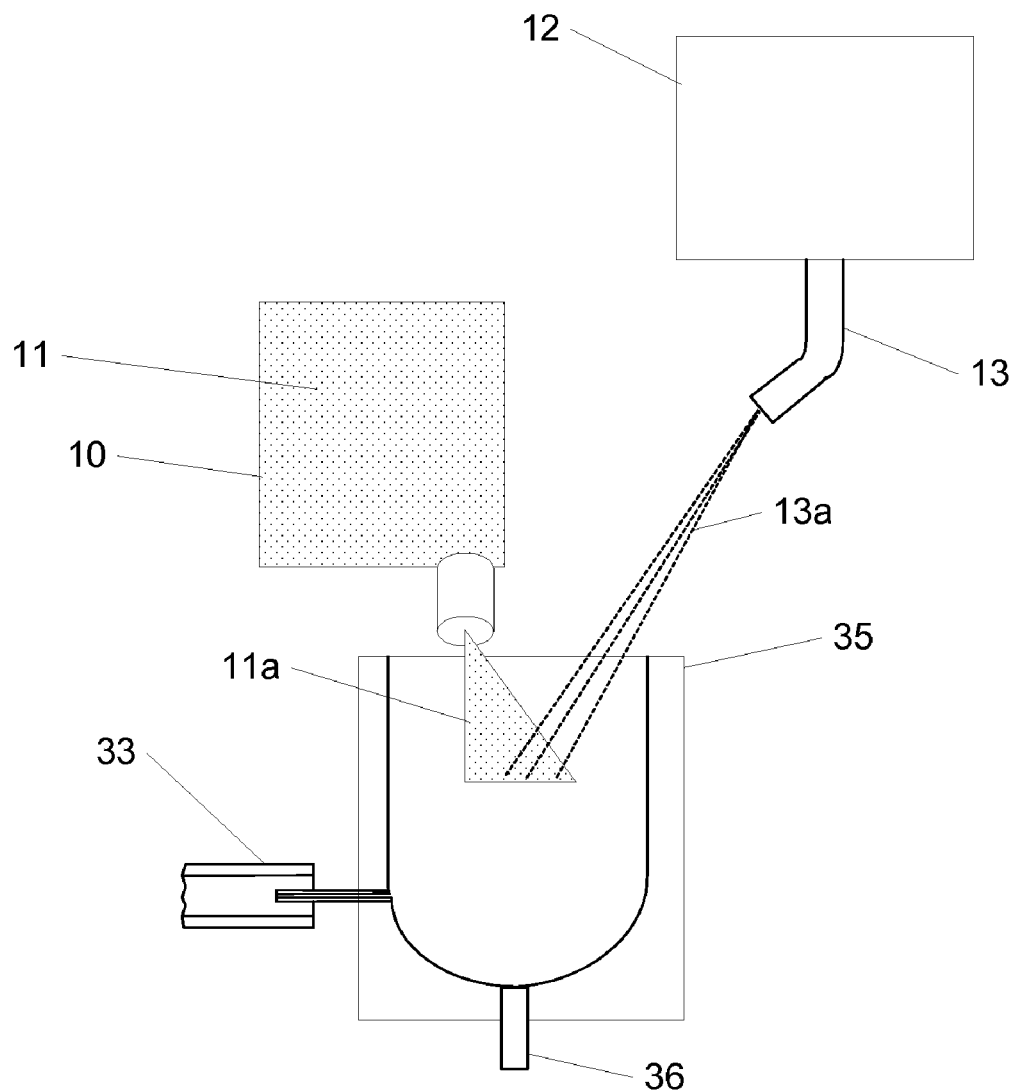
FIG. 3 is a schematic diagram showing pre-wetting and mixing similar to that shown in FIG. 1 though with an intermediate mixing container according to still another embodiment of the present invention.

FIG. 3 is a schematic diagram showing pre-wetting and mixing similar to that shown in FIG. 1 discussed above. However an intermediate container 35 for mixing exists in lieu of a container that is used by the end-user. As the intermediate container 35 is therefore re-used for multiple mixings, it is even more important to note that pre-wetting results in little or no residue left on surfaces of the mixing bowl (i.e., intermediate container 35) thereby mitigating microbial growth. The introduction of a tangential flow of liquid enhances mixing within the intermediate container 35. A liquid inlet 33 is provided for feeding such mixing liquid into the intermediate container 35 to thereby increase overall turbulence and mixing of the food liquid reconstituted from powder.

Figure 4:
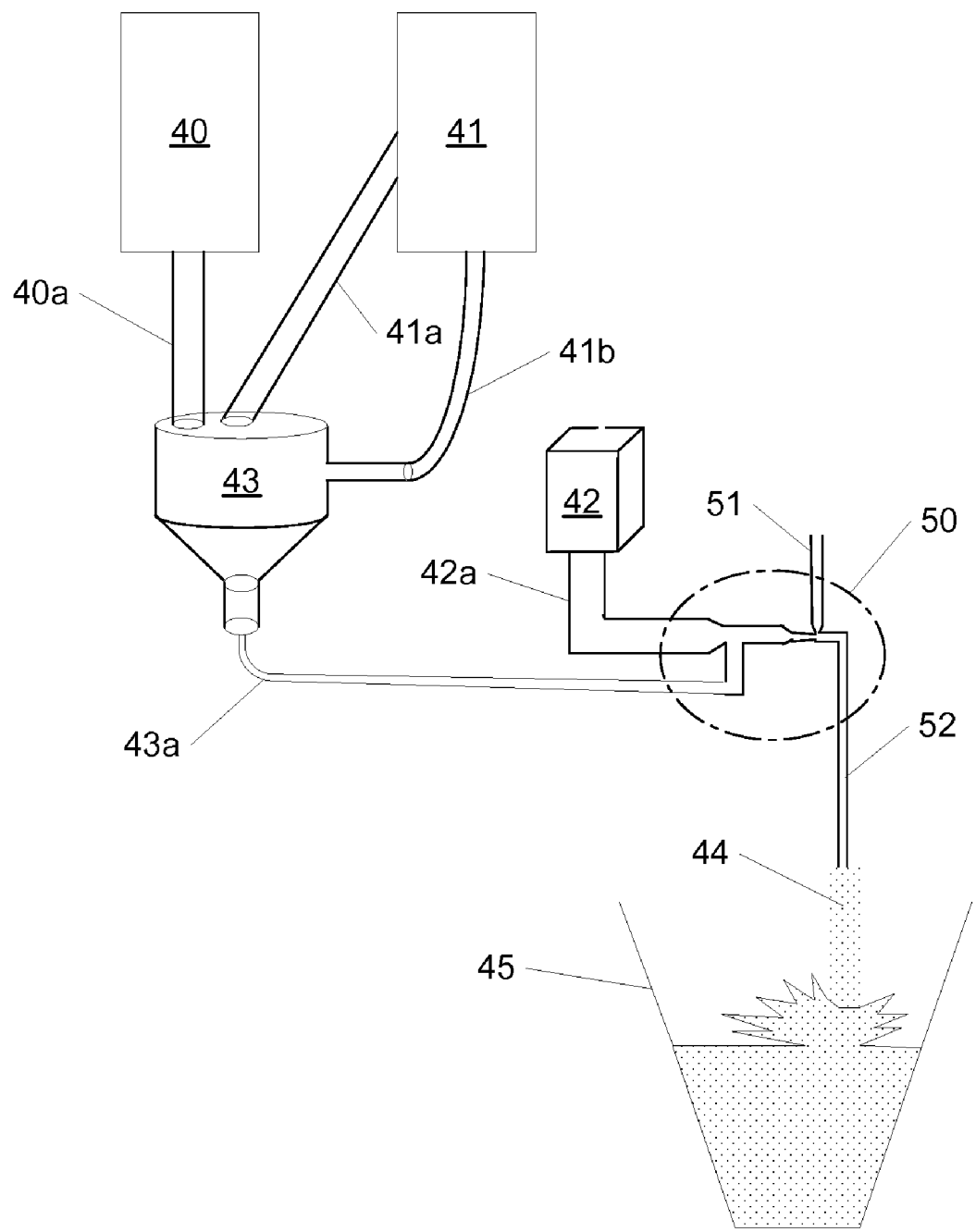
FIG. 4 is a schematic diagram showing an apparatus according to the present invention including pre-wetting and mixing in an intermediate container and frothing via a Venturi device.

Referring to FIG. 4, an intermediate container 43 is shown as provided in an apparatus according to the present invention including pre-wetting and mixing in the intermediate container 43 and frothing via a Venturi device 50. Similar to the aforementioned embodiments, a powder compartment 40 and a liquid compartment 41 are interoperable with the intermediate container 43 via respective dispensing conduit 40*a* and liquid conduits 41*a*, 41*b*. While the term conduit is used herein, it should be readily understood that any manner or mechanism for providing dispensed powder in some metered quantity and liquid(s) in some appropriate quantity, pressure, and flow-rate suitable for homogeneous mixing is provided. The homogeneous mixture is then aspirated through a mixture conduit 43*a* via a Venturi effect created by a Venturi device 50. The Venturi device 50 is formed by constrictions in the pathways and force of steam from a steam generator 42 flowing through a steam conduit 42*a*. Introduction of ambient air via an air conduit 51 causing desirable frothing of the food liquid. The ambient air may be implemented with a pre-filter to further ensure proper food hygiene. Accordingly, the frothed food liquid 44 exits from the dispensing conduit 52 into a container 45. Such container 45 is the end-user container similar to the container 15 seen in FIGS. 1 and 2. In this manner, a frothed food product is dispensed with high quality and stable foam properties.

Figure 5:
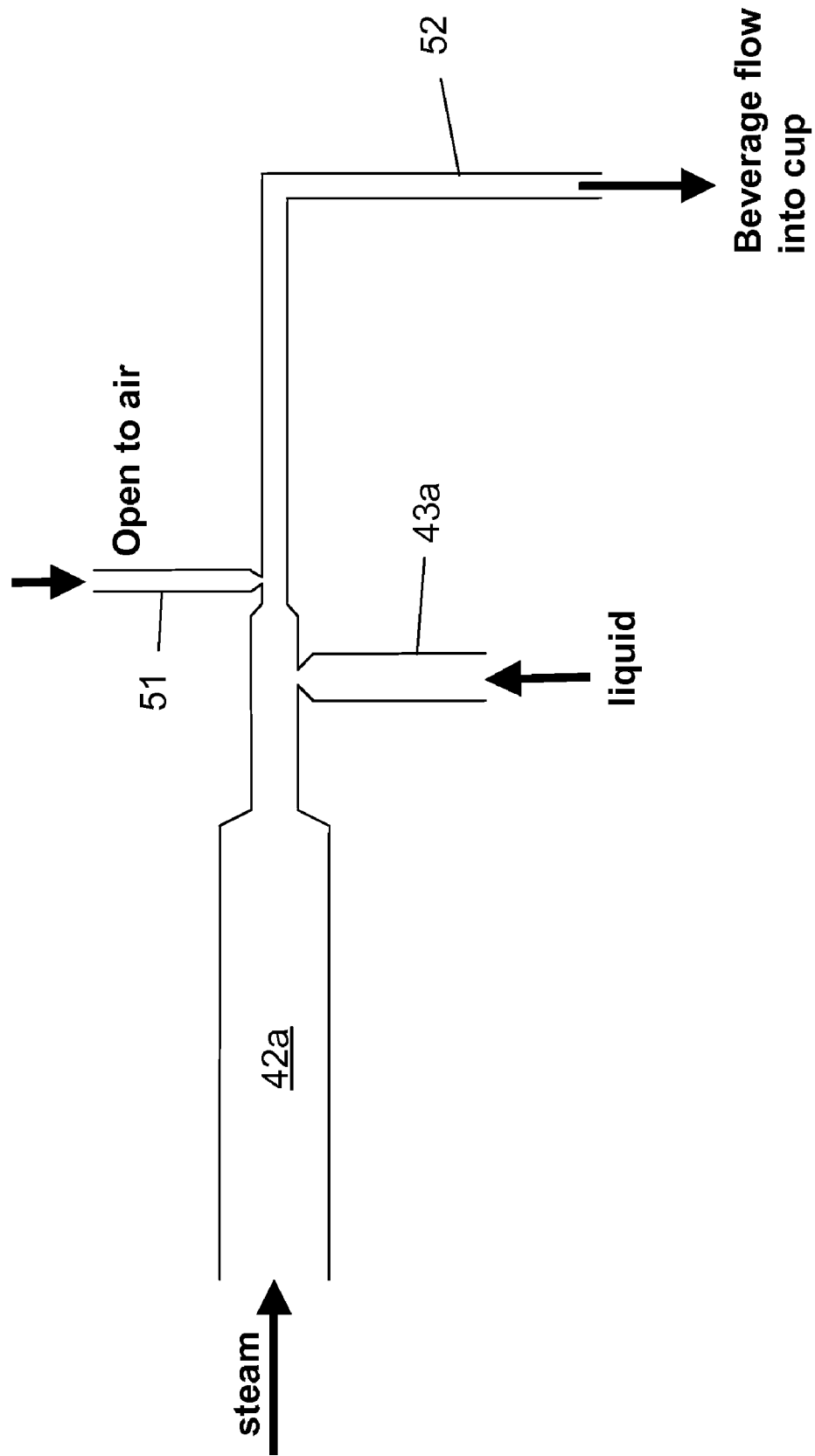
FIG. 5 shows a detailed schematic diagram of the Venturi device of FIG. 4.

FIG. 5 shows a detailed schematic diagram of the Venturi device of FIG. 4. Specifically, directional arrows are included to clearly present the flow of steam that, in the presence of conduit constrictions as shown causes the food liquid to aspirate via the Venturi effect and to froth when combined with air. Due to the high level of homogeneity in the food liquid and the rapid flow involved, such a configuration minimizes residual food liquid in conduits 43*a* or 52 and helps alleviate hygienic concerns.

Figure 6:
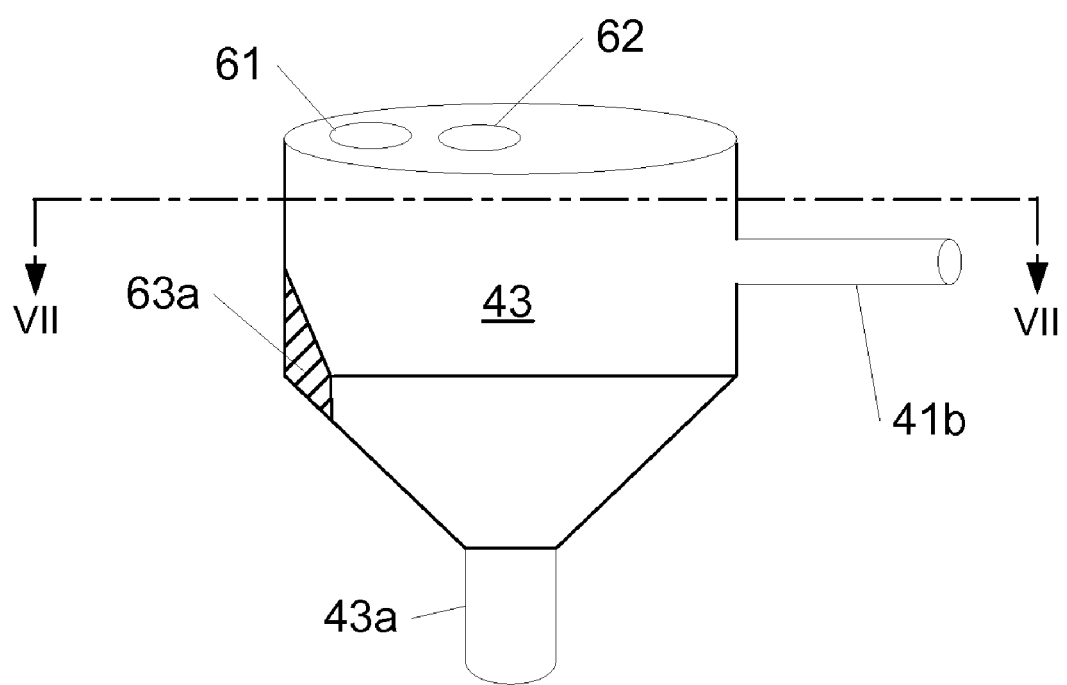
FIG. 6 shows the intermediate container of FIG. 4 with a partial cut-away revealing a baffle.

FIG. 6 shows the intermediate container 43 as shown and described above in relation to FIG. 4 but also shows a partial cut-away revealing a baffle 63*a*. While the interior of the intermediate container may be smooth, it is also preferable to provide raised areas that are themselves smooth. Such raised areas would be in the form of one or more baffles. Line VII-VII in FIG. 6 is taken across a section that reveals in corresponding FIG. 7 that three baffles 63*a*, 63*b*, and 63*c* are possible.

Figure 7:
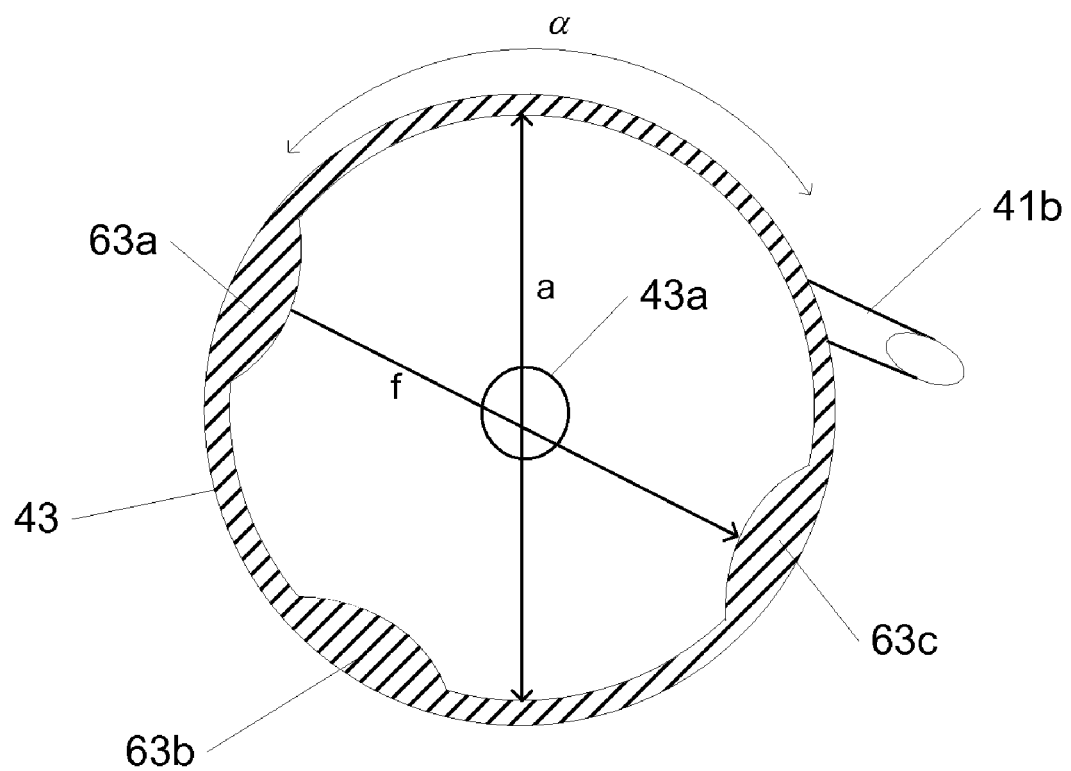
FIG. 7 shows a cut-away view of the intermediate container along cross-sectional line VII-VII of FIG. 6 revealing all three baffles.

With continued reference to FIG. 7, each baffle 63*a*, 63*b*, and 63*c* is spaced apart along the interior perimeter of the intermediate container 43. The baffles 63*a*, 63*b*, and 63*c* serve to enhance turbulence created by liquid introduced at liquid conduit 41*b*. For instance, it can be seen from FIG. 7 that the diameter a of the interior of the intermediate container 43 is greater than the distance f between opposing baffles 63*a* and 63*c*. This causes disruptions in the tangential flow created by liquid introduced at liquid conduit 41*b*. Further, the distance a along the perimeter of the intermediate container 43 between the liquid conduit 41*b* and baffle 63*a* further enhances turbulence. Although FIG. 7 shows three baffles 63*a*, 63*b*, and 63*c* are a liquid conduit 41*b* that enters the intermediate container 43 in a tangential manner, it should be readily understood that many different configurations are well within the intended scope of the present invention so long as turbulence is increased to effect improved mixing without creating dead-spots that would pose hygienic concerns. For purposes of the present invention, anywhere from no baffles up to five baffles are suitable. Several examples of such various configurations are shown in FIGS. 8, 9, and 10.

Figure 8:
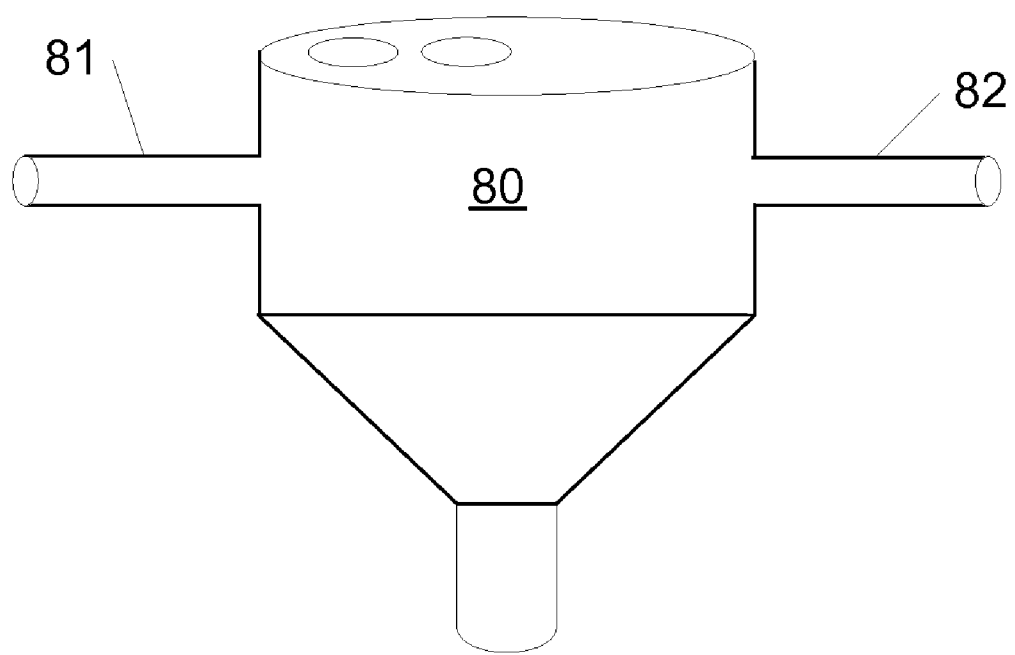
FIG. 8 shows one alternative intermediate container with two mixing streams along the same horizontal plane.
Figure 9:
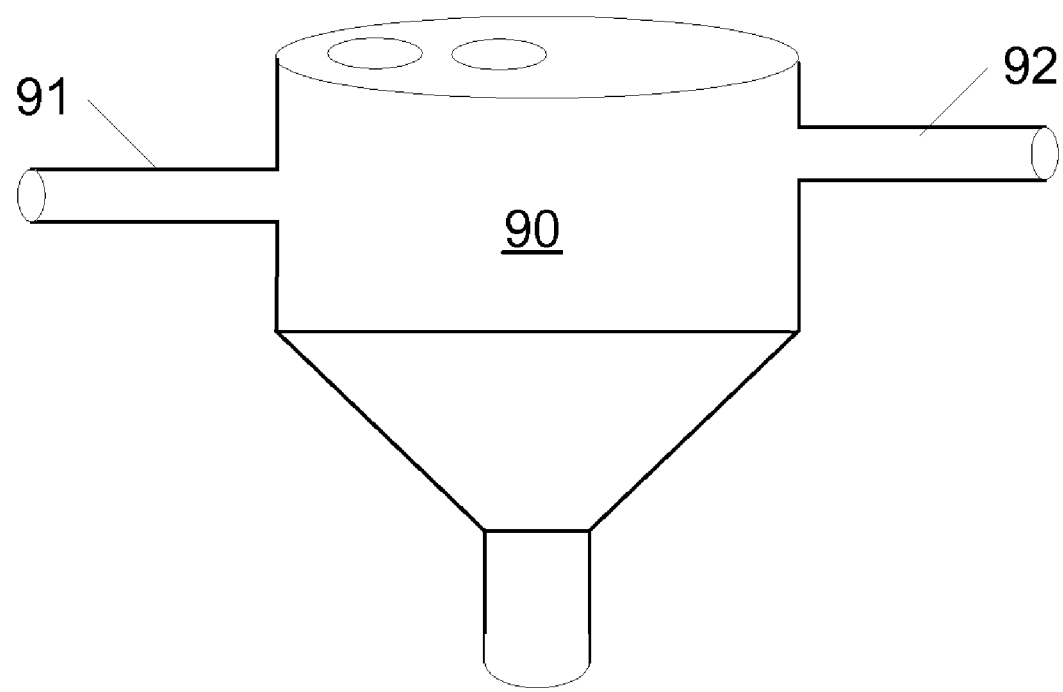
FIG. 9 shows another alternative intermediate container with two mixing streams along differing horizontal planes.

FIG. 8 shows one alternative intermediate container 80 with two mixing streams 81, 82 situated along the same horizontal plane such that liquid streams oppose one another. This arrangement would cause a churning type of turbulence. FIG. 9 shows another alternative intermediate container 90 with two mixing streams 91, 92 along differing horizontal planes. This arrangement would cause a rolling type of turbulence. It should be understood that baffles may be omitted if sufficient mixing exists for the given implementation with multiple opposing steams.

Figure 10:
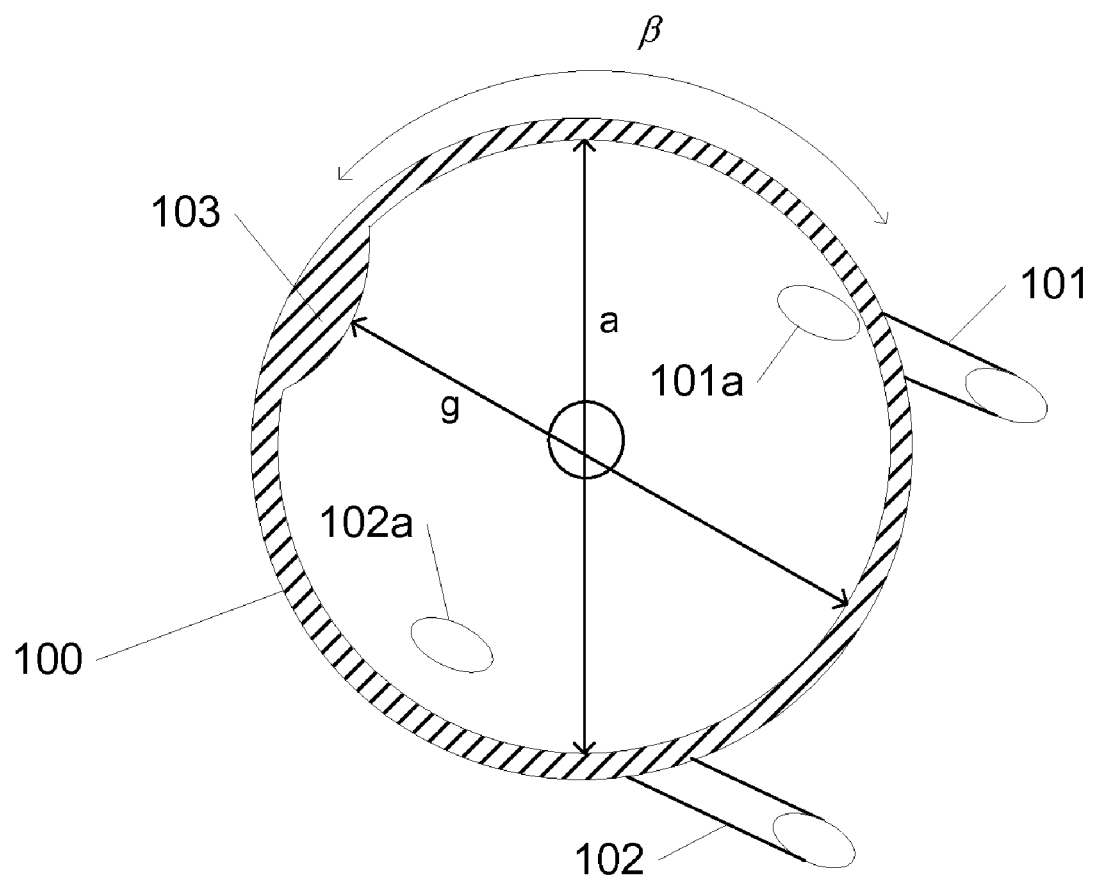
FIG. 10 shows still another alternative intermediate container in a cross-sectional view from above with two mixing streams along differing horizontal planes and including only one baffle.

FIG. 10 shows still another alternative intermediate container 100 in a cross-sectional view from above with two mixing streams 101, 102 along differing horizontal planes and including only one baffle 103. To increase mixing turbulence, the entry points 101*a* and 102*a* of the respective mixing streams 101 and 102 are on the lower funnel shaped bottom of the intermediate container 100. This would create opposing tornado type mixing forces interrupted by the baffle 103 as the diameter a of the interior of the intermediate container 100 is greater than the distance g shown. This causes disruptions in the tangential flow created by liquid introduced at entry points 101*a* and 102*a* further enhanced by the distance β along the perimeter of the intermediate container 100 between the liquid conduit 101 and baffle 103.

With further regard to FIGS. 7 and 10, it should be understood that the angular distances α and β (i.e., angular spread) may be, for example, 90, 120, and/or 270 degrees without straying from the intended scope of the present invention. Likewise, the baffles are smooth-surfaced, protuberances that serve to disrupt the flow of water introduced from the liquid inlets to create an agitating flow that enhances mixing. If baffles are provided, they may protrude into the cavity of the intermediate container by up to 10 mm and preferably between 4 and 6 mm. It should be understood that while specific dimensions or shapes may be described or shown, this is intended to be illustrative and not limiting.

A resulting food product reconstituted from a powder in accordance with the present invention is homogenous even for powders that are known to have difficult reconstitution characteristics such as, but not limited to, tomato soup powder. A desirable food product from the wet and mix methodology is attributed to wetting of the powder before it falls to the bottom of the mixing container. Once wetted, the powder quickly disperses and dissolves uniformly in the swirling water.

In terms of the homogeneity and visual appearance of the resultant food product, the wet and mix methodology in accordance with the present invention will yield a product that is improved over existing dispensed products. Subject to the desired application of the present invention, it should be readily understood that the water or other suitable liquid(s) for reconstitution of the powder(s) can be introduced at an ambient temperature, chilled by means of any known refrigeration system, or heated to a pre-set temperature range by any known heating such as a hot water tank, on-demand heater or by other methods known in the state of the art.

As discussed above, the method and apparatus of the present invention also provide frothing of the food liquid obtained from a powder and liquid mixture. The invention includes a wet and mix step, as described above, which may be further followed by steam frothing using a Venturi effect device. For an efficient Venturi effect and an optimized foam quality, the temperature of the food liquid entering the Venturi effect device should not exceed a certain temperature level, preferably, about 60° C. Therefore, the final temperature of the delivered food can be controlled by adjusting the temperature of water in the wet and mix step so that the final temperature after steam frothing reaches the desired temperature range. In addition, beverage temperature can be controlled by changing the ratio of water to steam. Steam is generated by methods known in the state of the art.

A pump or tap water pressure can be used to provide a continuous flow of ambient, chilled, or heated water with desired linear velocity range. Conventional methods are used to deliver a powder into a mixing area such as, but not limited to, a dosing screw auger, vibrational techniques, or metered puffs or streams of such powder via air-injection. The frothing portion of the present invention generally includes a steam generator and means to combine steam with reconstituted consumable powder(s) in a whipperless wet and mix manner to create uniform, high-quality foamed beverages in an improved hygienic way. In addition, the present invention is capable of generating steam foam from powder(s) and to dispense such in a container (e.g., cup, bowl, etc.) in a continuous manner.

Overall, the position of the liquid spray nozzle(s) forming the pre-wetting liquid stream affects mixing and hygiene. Each water inlet is preferably positioned so as to best achieve wetting of the powder to improve mixing and reduce unwet powder from entering the container. Further, the angle of the fan shaped spray from such spray nozzles also affects mixing. In accordance with the present invention, the angle of the pre-wetting liquid jets may vary for instance from 5 to 85 degrees, or from 30 to 75 degrees, or more preferably from 45 to 60 degrees from vertical—i.e., from the median of the diffuse liquid spray.

Further, liquid flow and linear velocity affects the homogeneity of the hydrated product. Improved mixing is achieved by having sufficient liquid pressure and flow to suitably wet the powder. In accordance with the present invention, liquid flow rates of the pre-wetting liquid may vary for instance from 5 to 50 ml/s or 16 to 25 ml/s or 18 to 22 ml/s. Related liquid linear velocity may preferably vary from 500 to 1600 cm/s, and most preferably from 1000 to 1300 cm/s. Flow rate of water streams may be created by tap-water pressure or a pump, e.g. by a peristaltic pump for pulsing water delivery, which further improves rehydration and mixing.

The present invention may involve product dispensing that include(s) one or more dispensing outlets/nozzles or similar devices that actually deliver the product (i.e., reconstituted consumable powder). This may include nozzle heads specific for each type of product or a single nozzle head for all products. To significantly minimize cleaning, the mixing container should contain only smooth surfaces without dead spots for powder, liquid, or rehydrated product.

Frothing in accordance with the present invention results in a high quality of foam, especially when generated by steam frothing. High quality is indicated by characteristics including small size bubbles distributed uniformly, stiff texture, stability, wetness, and absence of lumps of un-dissolved powders. A better product from the wet and mix system as compared to no wetting and mixing is understood to be due to wetting of the powder before it falls into the mixing bowl. Once wetted, the powder quickly disperses and dissolves uniformly in the swirling water. Therefore, only liquid enters the Venturi such that this renders the frothing process efficient.

In some embodiments, the present invention may include a plurality of sources of powders. More than one powder may be delivered and such powders may be delivered simultaneously or serially by means of a control device and based on final product formulation requirements. For example, a flavoured instant coffee powder reconstituted followed by a froth and subsequent application of a dry cinnamon powder thereupon is within the scope of the present invention. A control device is capable of switching on/off the powder source(s) that are not needed and, therefore, allowing the discharge of only the correct powder(s). Powders to be used include milk, whiteners, powdered beverages such as coffee, tea, cocoa, etc. or mixture thereof.

In addition, the present invention may include a plurality of sources of shelf stable liquid concentrate(s), e.g., milk concentrate. More than one liquid concentrate may be delivered. Liquid concentrates may be delivered simultaneously or serially by means of a control device and based on final product formulation requirements. The control device is capable of switching on/off the shelf stable liquid concentrate source(s) that are not needed and, therefore, allowing the discharge of only the correct concentrate(s). Liquid concentrate(s) to be used include milk, whiteners, and beverage concentrates such as coffee, tea, cocoa, sugar etc. or mixture thereof. The present invention is suitable for at least large-scale high-volume usage.

By way of the present invention, an enhanced in-cup quality can be obtained with freshness and steam froth attributes. Safety and hygiene are improved by avoiding the use of liquid milk requiring refrigeration. Operator functions are reduced as are maintenance and cleaning requirements. As no mechanical whippers exist in the present invention, there are no gasket leakage concerns. Required dismantling of and number of machine parts or components (e.g., for cleaning or maintenance) is reduced compared to conventional whipper systems. The complexity of the invention components is relatively low in that mechanical and electrical parts are reduced—e.g., a motor is not required as there is no whipper and the number of controllers is reduced. Accordingly, there are less potential requirements for service calls and overall advantages should result in an overall lower cost system.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An apparatus for reconstituting consumable powder in a container comprising:
   a mixing container;
   a receptacle for holding and dispensing powder into said mixing container;
   a liquid delivery means for dispensing a wetting liquid stream into said mixing container, said wetting liquid stream for pre-wetting said powder in mid-air within said mixing container by wetting said powder as said powder is dispensed in order to form a wetted powder; and
   a liquid inlet disposed to deliver a mixing liquid stream into said mixing container in a direction approximately tangential to an inner wall of said mixing container in order to increase turbulence and mixing, said mixing liquid stream for mixing said wetted powder with liquid to form a food liquid reconstituted from said powder.

2. The apparatus according to claim 1, further including a pressure delivery means selected from a group consisting of tap pressure, a pump delivering constant pressure, and a peristaltic pump delivering pulsed pressure.

3. The apparatus according to claim 1, wherein said mixing liquid stream includes more than one mixing stream.

4. The apparatus according to claim 3, wherein said more than one mixing stream are disposed at different heights of said mixing container.

5. The apparatus according to claim 1, wherein said wetting liquid stream is formed to cover an angle between 5 and 85 degrees from a median of said wetting liquid stream.

6. The apparatus according to claim 1, wherein said wetting liquid stream is formed to cover an angle between 30 and 70 degrees from a median of said wetting liquid stream.

7. The apparatus according to claim 1, wherein said wetting liquid stream is formed to cover an angle between 45 and 60 degrees from a median of said wetting liquid stream.

8. The apparatus according to claim 1, wherein said mixing container includes one or more baffles.

9. The apparatus according to claim 1, further comprising,
   a steam generator for generating steam in communication with said food liquid, and a Venturi effect device for frothing said food liquid.

* * * * *